(12) United States Patent
Fahrni, Jr. et al.

(10) Patent No.: US 7,503,867 B2
(45) Date of Patent: Mar. 17, 2009

(54) BEARING ARRANGEMENT FOR THE INPUT SHAFT OF A FORWARD AXLE IN A TANDEM AXLE DRIVE

(75) Inventors: Glenn R. Fahrni, Jr., Dalton, OH (US); Wayne D. Barnette, Massillon, OH (US)

(73) Assignee: The Timken Company, Canton, OH (US)

( * ) Notice: Subject to any disclaimer, the term of this patent is extended or adjusted under 35 U.S.C. 154(b) by 302 days.

(21) Appl. No.: 11/378,502

(22) Filed: Mar. 17, 2006

(65) Prior Publication Data
US 2007/0219039 A1    Sep. 20, 2007

(51) Int. Cl.
*F16H 48/06* (2006.01)
*F16C 23/00* (2006.01)
(52) U.S. Cl. ................... 475/230; 384/583
(58) Field of Classification Search .......... 475/230; 384/583
See application file for complete search history.

(56) References Cited

U.S. PATENT DOCUMENTS

| | | | |
|---|---|---|---|
| 1,231,320 A | 6/1917 | Alden | |
| 1,503,849 A * | 8/1924 | Proctor | 384/583 |
| 2,438,542 A * | 3/1948 | Cushman | 416/147 |
| 2,578,155 A | 12/1951 | Slider | |
| 3,069,928 A * | 12/1962 | Cote et al. | 475/246 |
| 3,131,578 A * | 5/1964 | Elliott | 475/231 |
| 4,150,468 A * | 4/1979 | Harbottle | 29/898.09 |
| 5,560,687 A * | 10/1996 | Hagelthorn | 301/105.1 |
| 6,227,716 B1 | 5/2001 | Irwin | |
| 6,544,140 B2 | 4/2003 | Gradu et al. | |
| 6,659,651 B1 | 12/2003 | Turner et al. | |
| 6,705,965 B2 * | 3/2004 | Sullivan | 475/230 |
| 2004/0087408 A1 * | 5/2004 | Ziech et al. | 475/222 |
| 2004/0204282 A1 * | 10/2004 | Green et al. | 475/231 |

(Continued)

FOREIGN PATENT DOCUMENTS

DE      872 893       4/1953

(Continued)

OTHER PUBLICATIONS

Publication, "Automotive Bearing Applications", The Timken Company, TTDDD00025, pp. 1, 32.

(Continued)

*Primary Examiner*—Ha D. Ho
(74) *Attorney, Agent, or Firm*—Polster, Lieder, Woodruff & Lucchesi, L.C.

(57) ABSTRACT

An axle center for the forward axle in a vehicle having tandem drive axles includes a housing containing input, output and through shafts that rotate in the housing about a common axis on front, rear and through shaft antifriction bearings. The front and rear bearings, which support the input and output shafts, are mounted in opposition. The front bearing has an outer race provided with an external thread that engages an internal thread within the housing. That outer race is fitted with a locking ring provided with an inner flange that is engaged to turn the race and thereby bring the front and rear bearings into the correct adjustment. The locking ring also has an outer flange which is engaged with the housing once the front and rear bearings are correctly adjusted so as to maintain the correct adjustment.

15 Claims, 4 Drawing Sheets

U.S. PATENT DOCUMENTS

| | | | |
|---|---|---|---|
| 2005/0022385 A1 | 2/2005 | Slesinski | |
| 2005/0063629 A1* | 3/2005 | Fahrni et al. | 384/583 |
| 2005/0113204 A1* | 5/2005 | Wenstrup et al. | 475/230 |
| 2007/0269157 A1* | 11/2007 | Fahrni et al. | 384/569 |

FOREIGN PATENT DOCUMENTS

| | | |
|---|---|---|
| JP | 2001336606 | 12/2001 |
| WO | 2005 054718 | 6/2005 |
| WO | 2006 014199 | 2/2006 |
| WO | WO2006/014199 | 2/2006 |
| WO | WO2006/020694 | 2/2006 |
| WO | WO2006/127878 | 11/2006 |

OTHER PUBLICATIONS

International Search Report for corresponding International Application No. PCT/US2207/064218—Mailing Date: Apr. 21, 2008.

Written Opinion of the International Searching Authority for corresponding International Application No. PCT/US2007/064218—Mailing Date: Apr. 21, 2008.

* cited by examiner

BEARING ARRANGEMENT FOR THE INPUT SHAFT OF A FORWARD AXLE IN A TANDEM AXLE DRIVE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

This invention relates in general to automotive vehicles having tandem axles and more particularly to a bearing arrangement for the input shaft of an axle center for a forward axle in such a vehicle.

Many large over-the-road trucks have tandem drive axles, with each axle being equipped with an axle center containing a differential and axle shafts that transfer power from the differential to road wheels at the ends of the axle. The forward axle center, in contrast to the rear axle center, contains aligned input and output shafts that are connected through an interaxle differential and a through shaft that is aligned with and coupled directly to the output shaft. These shafts transfer power from the drive shaft of the vehicle to the rear axle center. The input shaft also carries a helical gear that drives a pinion shaft forming part of the differential for the forward axle center. The input shaft should rotate with stability, that is to say, its axis of rotation should remain fixed with respect to the housing in which it rotates. But achieving stability demands a good measure of skill and time during the assembly of the axle center, primarily to adjust the bearings that support the input shaft. Typically, this involves selecting shims of the correct size and installing them behind the cup (outer race) or behind a cup carrier or cup follower for the forwardmost of the two bearings that support the input shaft.

In those axle centers which have the cup of the front bearing actually within the housing itself—as opposed to within a cup carrier—a loose fit often exists between the cup and the housing to facilitate adjustment of the bearings that support the input shaft. This allows the cup to turn within the housing, causing wear which produces an even looser fit and less stability for the input shaft.

DETAILED DESCRIPTION OF THE INVENTION

Figure 1:
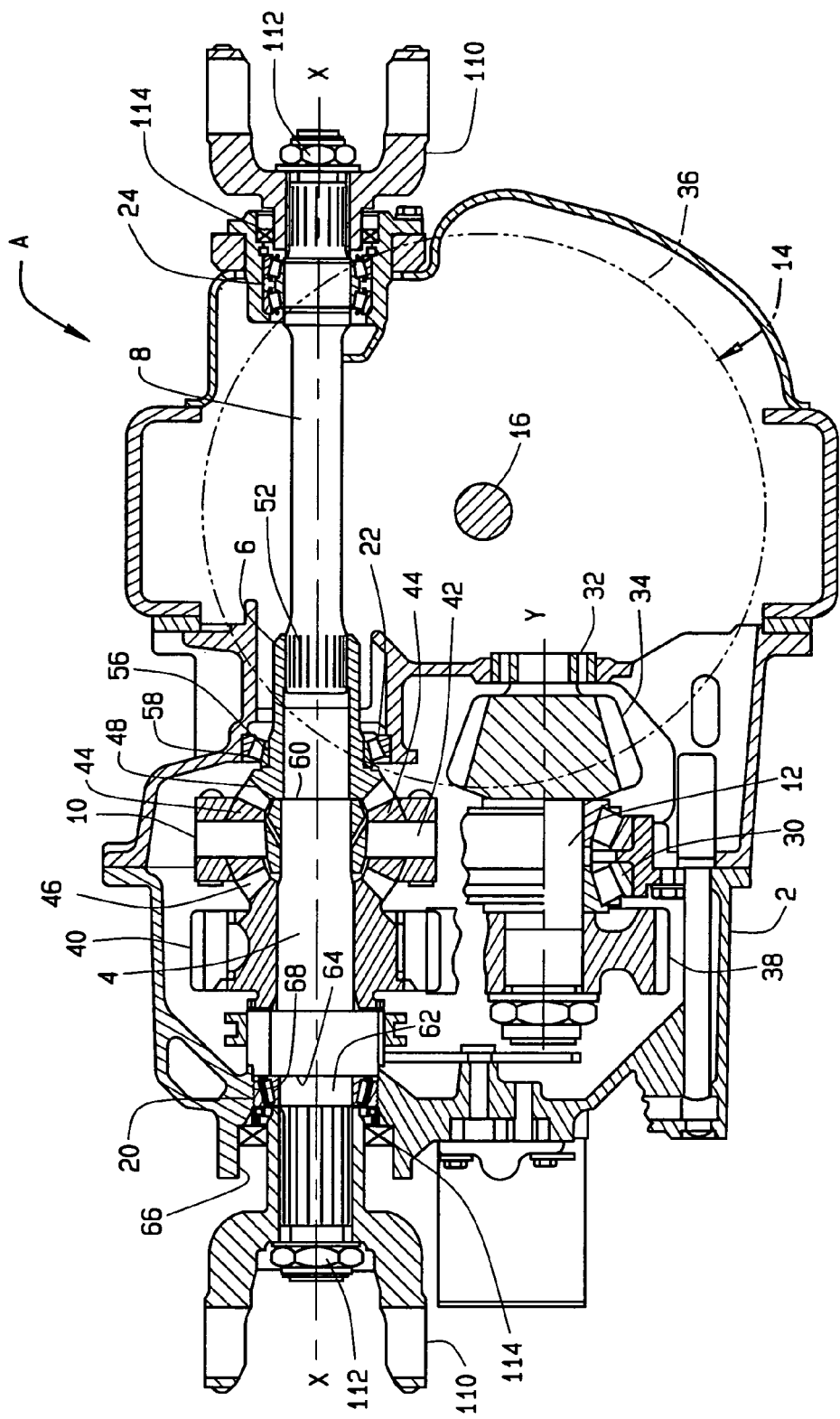
FIG. 1 is a longitudinal sectional view of an axle center for the forward axle of a tandem axle, with the axle center being constructed in accordance with and embodying the present invention.

Referring now to the drawings, an axle center A (FIG. 1) forms part of a forward drive axle in an automotive vehicle having tandem drive axles. It serves to transfer power from a drive or propeller shaft to road wheels at the ends of the forward axle and also to transmit power to a rear axle having additional road wheels at its ends. Thus, the road wheels at the ends of both axles serve to propel the vehicle.

The axle center A includes (FIG. 1) a cast iron housing 2 and also three steel shafts—namely, an input shaft 4, an output shaft 6 and a through shaft 8—that are aligned and together extend completely through the housing 2 where they rotate about a common axis X. Within the housing 2, the forward end of the output shaft 6 receives the rear end of the input shaft 4 such that the two shafts can rotate at slightly different velocities if necessary. Moreover, the input and output shafts 4 and 6 are coupled through an interaxle differential 10, whereas the through shaft 8 is connected directly to the output shaft 8. In addition, the axle center A contains a pinion shaft 12 that is likewise located in the housing 2 where it rotates about an offset axis Y and a differential gear 14 that couples the pinion shaft 12 to two axle shafts 16 that extend away from the axle center A to road wheels that they drive.

The axis X about which the input shaft 4, output shaft 6 and through shaft 8 rotate possesses a good measure of stability owing to three antifriction bearings —namely, a front bearing 20, a rear bearing 22, and a through shaft bearing 24. The front bearing 20 and rear bearing 22 take the form of a single row tapered roller bearings and support the input shaft 4 and output shaft 6. The through shaft bearing 24 preferably takes the form of a double row tapered roller bearing, and it supports the through shaft 8. The front and rear bearings 20 and 22 are mounted in opposition in the direct configuration, with adjustment being provided at the front bearing 20.

The pinion shaft 12 rotates in the housing 2 about the axis Y that is offset below, yet parallel to, the axis X. It is supported on two single row tapered roller bearings 30 that are mounted in opposition and may also be supported on a cylindrical roller bearing 32. At one end the pinion shaft 12 carries a beveled pinion 34 that meshes with a ring gear 36, both forming part of the differential gearing 14. At its other end the pinion shaft 12 is fitted with a helical gear 38 that meshes with another helical gear 40 on the input shaft 4. Thus the input shaft 4 drives the pinion shaft 12 through the meshed gears 40 and 38.

The input shaft 4 not only carries the helical gear 40, but also the interaxle differential 12. It includes a spider 42 that is located around the input shaft 4, yet can rotate on the shaft 4. The spider 42 in turn carries a pair of bevel gears 44 that have the capacity to rotate on the spider 42 about an axis that is perpendicular to the axis X. The bevel gears 44 mesh with a side bevel gear 46 on the one end of the helical gear 40 and with another side bevel gear 48 on the end of the output shaft 6 where the output shaft 6 fits over the end of input shaft 4. The rear bearing 22 lies between the output shaft 6 and the housing 2 and thus supports the output shaft 6 as well as the rear end of the input shaft 4 in the housing 2. The rear bearing 22 also supports the front end of the through shaft 8 in the housing 2. To this end, the output shaft 6 projects axially beyond the rear end of the input shaft 4 to receive the front end of the through shaft 8. Here output shaft 6 and through shaft 8 are coupled through mating splines 52.

To accommodate the rear bearing 22, the output shaft 6 is provided with a bearing seat 56 that includes a shoulder that faces toward the through shaft 8. The housing 2 likewise has a bearing seat 58 and it surrounds the seat 56 on the output shaft 6. It is provided with a shoulder that faces the shoulder on the bearing seat 56 of the output shaft 6. The bearing 22 confines the output shaft 6 in one axial direction. The output shaft 6 abuts a shoulder 60 on the input shaft 4, and that shoulder 60 serves to confine the output shaft 6 in the other axial direction. Thus, the output shaft 6 is captured axially between the rear bearing 22 and the shoulder 60 on the shaft 4.

At its opposite end the input shaft 4 has a bearing seat 62 that accommodates the front bearing 20. It includes another shoulder 64 that faces away from the helical gear 40. The seat 62 lies within a counterbore 66 that opens out of the housing 2 and includes an internal thread 68 through a portion of it. The thread 68 forms a front bearing seat in the housing 2.

Figure 2:
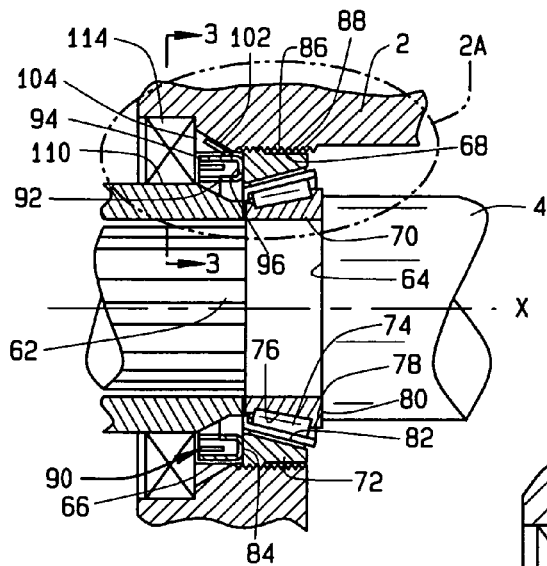
FIG. 2 is an enlarged fragmentary sectional view of the front bearing for the input shaft and surrounding housing of the axle center, with the front bearing having its cup secured against rotation by a locking ring.

Each bearing 20 and 22 that supports the input shaft 4 includes (FIG. 2) an inner race in the form of a cone 70, an outer race in the form of a cup 72 that surrounds the cone 70, and rolling elements in the form of tapered rollers 74 located in a single row between the cone 70 and cup 72. The cone 70 has a tapered raceway 76 that faces outwardly away from the axis X. Its large end lies along a thrust rib 78 that leads out to a back face 80 that is perpendicular to the axis X. It forms one end of the cone 70. The cup 72 has a tapered raceway 82 that faces inwardly toward the tapered raceway 76 on the cone 70. At the small end of the raceway 76 the cup has a back face 84 that is also perpendicular to the axis X. The cup 72 of the front bearing 20 differs from the cup 72 of the rear bearing 22 in that along its peripheral surface it has an external thread 86 that is configured to engage the internal thread 68 in the housing 2. Where the cup 72 is case carburized and hardened along its case, the thread 86 may be cut through the hard case ("hard turned"), in that thread-cutting tools now exist for that purpose. On the other hand, where the cup 72 is formed from high carbon steel, it may be induction heated along the raceway 82 only, and then quenched, leaving the peripheral surface capable of being machined with more conventional cutting tools.

The tapered rollers 74 along their tapered side faces contact the raceways 76 and 82 of the cone 70 and cup 72 and along their large end faces bear against the thrust rib 78. Indeed, the thrust rib 78 prevents the rollers 74 from moving up the raceways 76 and 82 and out of the annular space between the cone 70 and cup 72. The rollers 74 are on apex, meaning that the envelopes of their conical surfaces and the envelopes of the raceways 76 and 82 have their apices at a common point along the axis X.

The cone 70 of the rear bearing 22 fits over the bearing seat 56 on the output shaft 6 with its back face 80 against the shoulder of that seat 56, so that the large ends of the tapered rollers 74 are presented toward the spider 42 of the differential 10. The cup 72 of the rear bearing 22 fits into the bearing seat 58 of the housing 2 with its back face 84 against the shoulder of that seat 58. Interference fits exist between the cone 70 and its seat 56 and the cup 72 and its seat 58.

Figure 2A:
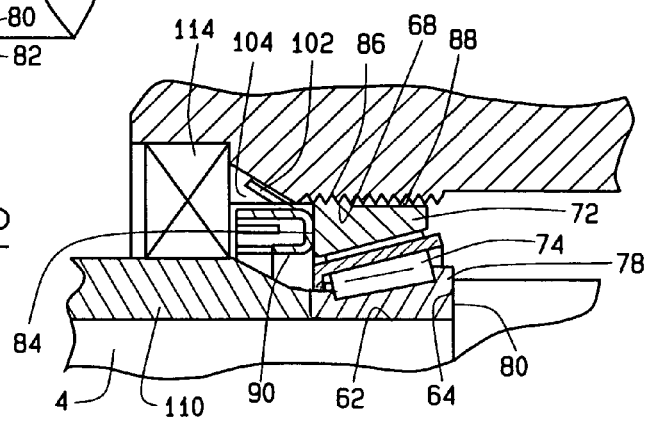
FIG. 2A is an enlarged fragmentary sectional view of the front bearing.

The cone 70 of the front bearing 20 fits over the bearing seat 62 at the other end of the input shaft 4 with an interference fit, its back face 80 being against the shoulder 64 of that seat 62, so that the large ends of the rollers 74 for the bearing 20 face the large ends of the rollers 74 for the rear bearing 22. This is commonly referred to as a direct mounting. The cup 72 for the front bearing 20, in contrast to the cup 72 for the rear bearing 22, along its periphery has the external thread 86 (FIG. 2A) that leads away from the back face 80 and a cylindrical surface 88 for the remainder of its periphery. The external thread 86 occupies between 33% and 50% of the length of the cup 72. The diameter of the cylindrical surface 88 is slightly less than the diameter of the crests on the internal thread 68. Preferably, those crests are truncated.

The cup 72 of the front bearing 20 fits into the counterbore 66 of the housing 2 with its external thread 86 engaging the internal thread 68 in the housing 2, and with its cylindrical surface 88 lying along the crests of the internal thread 68. Thus, the cup 72 for the front bearing 20 may be moved axially by rotating the cup 72 in the internal thread 68. And the axial position of the cup 72 determines the setting for the bearing system formed by the front and rear bearings 20 and 22. Hence, rotation of the single threaded cup 72 at the front of the housing 2 provides adjustability for the bearing system.

Figure 3:
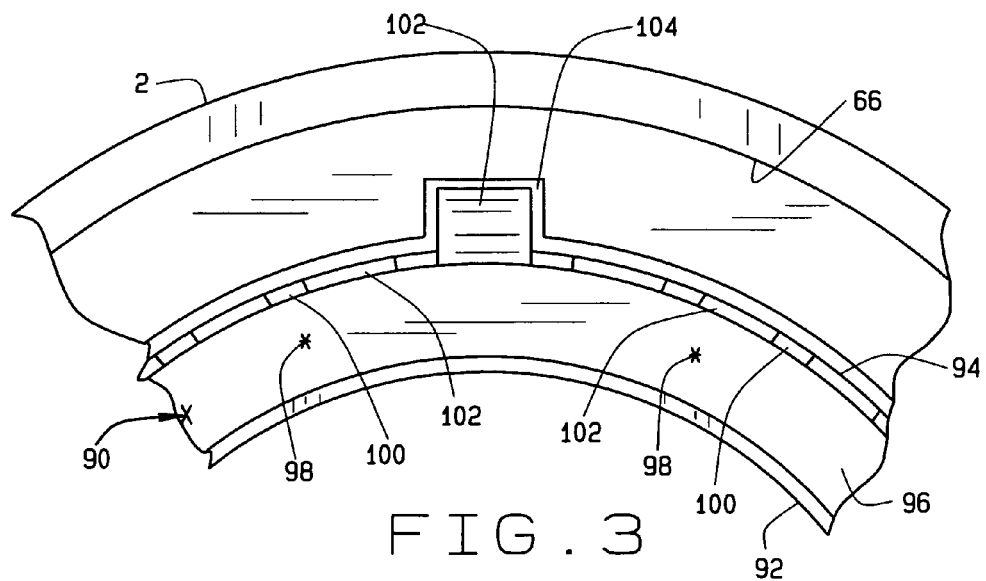
FIG. 3 is a fragmentary sectional view taken along line 3-3 of FIG. 2.

To effect rotation of the cup 72 for the front bearing 20 and securement of it in a desired position, the cup 72 is provided with locking ring 90 (FIGS. 2 & 3) that fits against the cup back face 84 to which it is secured, preferably by welding. More specifically, the ring 90 includes an inner flange 92, and an outer flange 94, as well as a web 96 connecting the two flanges 92 and 94. The diameter of the inner flange 92 corresponds generally to the diameter of the small end of the raceway 82 for the cup 72. The diameter of the large flange 94 is essentially that of or slightly less than the external diameter of the cup 72. The web 96 lies against the back face 84 of the cup 72 and covers essentially the entire back face 84. Here the ring 90 is attached to the cup 72, preferably by several projection welds 98 spaced generally equally along the web 96, although mechanical fasteners that engage the cup 72 are suitable as well.

The inner flange 92 provides a surface for gripping and turning the locking ring 90 and of course the cup 72 to which the ring 90 is attached, and this enables the cup 72 to be advanced to a position which provides the correct adjustment for the bearings 20 and 22. To this end, the inner flange 92 may be provided with slots or openings capable of receiving projections on an adjusting tool that can rotate the ring 90.

The outer flange 94 contains axially directed slits 100 located at equal circumferential intervals around it, and these slits 100 divide the flange 94 into segments 102 that may be bent outwardly. The housing 2 at the counterbore 66 into which the cup 72 threads has an angular recess 104 that opens radially into the counterbore 66 and is just large enough to receive one of the segments 102. Indeed, once the bearings 20 and 24 achieve the correct setting by turning the cup 72 of the front bearing 20, the segment 102 that aligns with the angular recess 104 is bent outwardly into the angular recess 104, thereby creating a tab that prevents rotation of the cup 72. This maintains the setting established by the rotation of the cup 72.

The cup 72 along its external surfaces, including the back face 84, is formed from high carbon steel, preferably as a consequence of case carburizing. The locking ring 90, on the other hand, is a stamping formed from low carbon steel, and is thus malleable enough to enable the segments 100 of the outer flange 94 to be plastically deformed outwardly. U.S. patent application Ser. No. 11/118,311 of David L. Milam, filed Apr. 29, 2005, discloses a process for welding the low carbon steel of the locking ring 90 to the high carbon steel of the cup 72. It is incorporated herein by reference.

Both the input shaft 4 and the through shaft 8 have ends that project out of the housing 2. Fitted to these ends at mating splines are yokes 110 (FIG. 1) for universal joints. The yoke 110 for the input shaft 4 is coupled to the drive shaft for the vehicle, whereas the yoke 110 for the through shaft 8 is coupled to a short connecting shaft that extends between it and the axle center for the rear axle. The yokes 110 are secured to their respective shafts 4 and 6 with nuts 112 that thread over the ends of the shafts 4 and 6. The annular spaces between the housing 2 and the yokes 110 are closed by seals 114.

Figure 4:
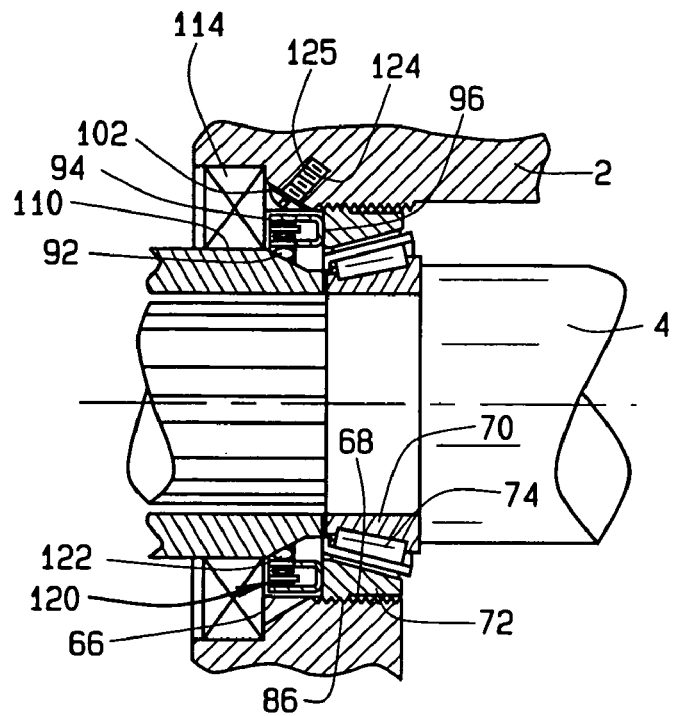
FIG. 4 is a sectional view similar to FIG. 2, but showing a front bearing with an alternate locking ring.

An alternate locking ring 120 (FIG. 4) is similar to the locking ring 90 in that it has inner and outer flanges 92 and 94 and a web 96, with the outer flange 94 being divided into segments 102 by axial slits 100. However, each segment 102 has a circular hole 122. Moreover, the housing 2, at the angular recess 104 that opens into the counterbore 60, has a threaded hole 124 that opens into the recess 104. When the appropriate segment 102 of the outer flange 94 is bent into the recess 104, the hole 122 in the tab formed by that segment 102 aligns with the threaded hole 124 in the housing 2. To secure the ring 120 firmly to the housing 2, a short screw 125 is inserted through the hole 122 in the segment 102 and threaded into the aligned hole 124.

Figure 5:
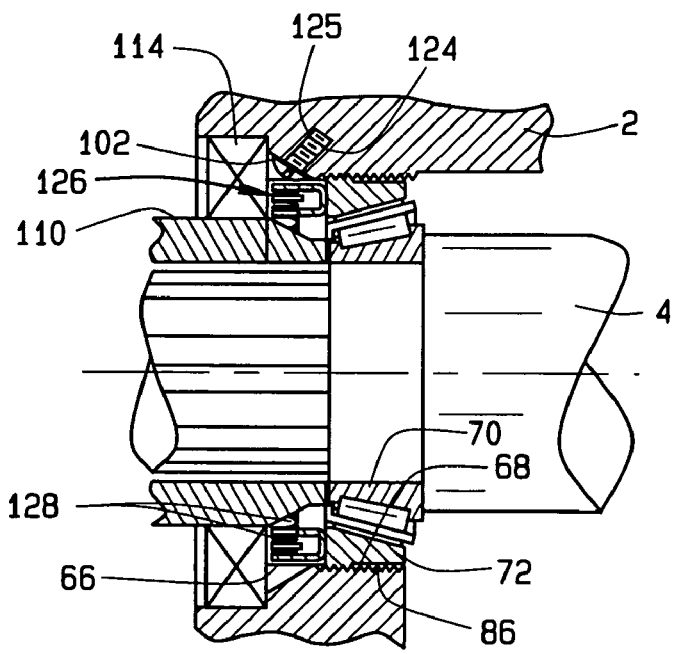
FIG. 5 is a sectional view similar to FIG. 2, but showing a front bearing with another alternate locking ring.

Another alternate locking ring 126 (FIG. 5) is very similar to the ring 120. However, its segments 102 have slots 128 that open out of their ends of the outer flange 94 in lieu of circular holes 122.

Figure 6:
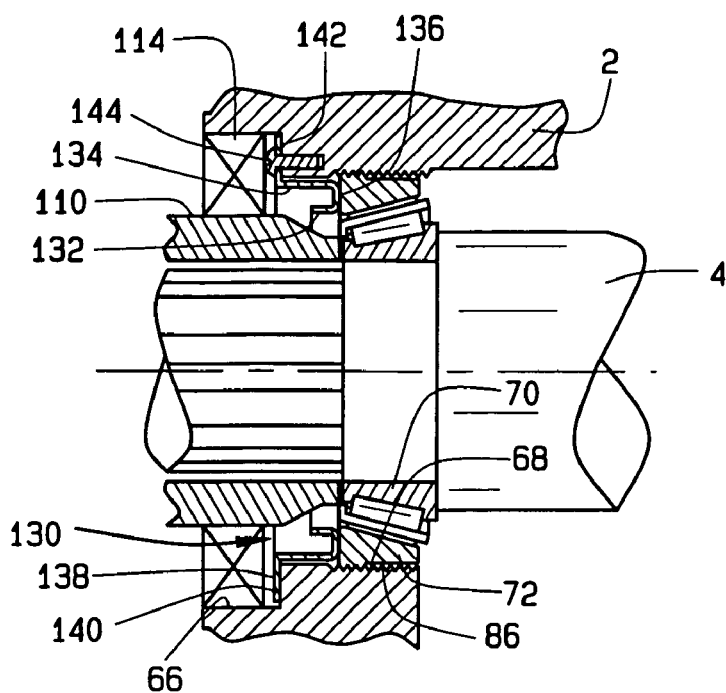
FIG. 6 is a sectional view similar to FIG. 2, but showing still another alternate locking ring.

Still another alternate locking ring 130 (FIG. 6) has inner and outer flanges 132 and 134 and a connecting web 136 that correspond to their counterparts in the ring 120, except that the outer flange 134 is not segmented. The ring 130 also has a lip 138 that turns outwardly away from the outer flange 134. The lip 138 lies against a shoulder 140 in the counterbore 66 of the housing 2 and contains a hole 142. The hole 142 receives a screw 144 that is threaded into the housing 2 to secure the locking ring 130 and cup 72 against rotation.

Figure 7:
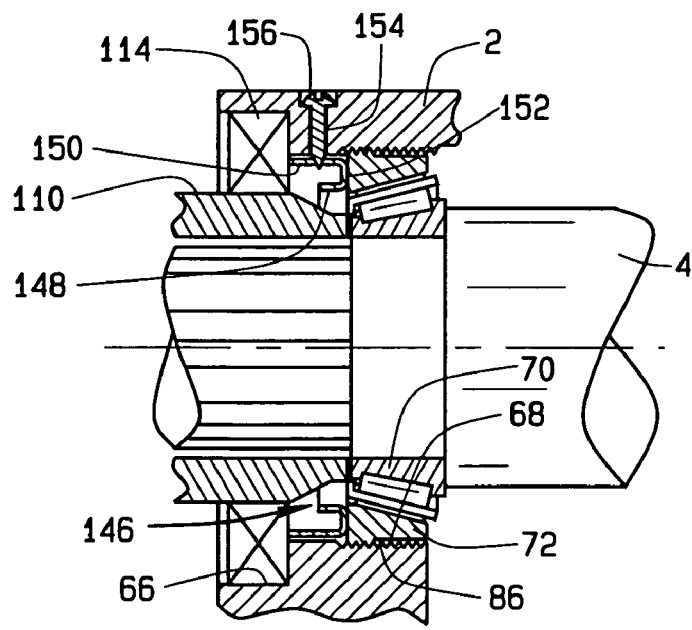
FIG. 7 is a sectional view similar to FIG. 2, but showing yet another alternate locking ring.

Yet another alternate locking ring 146 (FIG. 7) has inner and outer flanges 148 and 150 and a web 152 that correspond to their counterparts in the ring 120, except that the outer flange 150 is not segmented. The housing 2, on the other hand, contains a threaded hole 154 that opens into the counterbore 66 forwardly from the cup 72. Indeed, the threaded hole 154 opens toward the outer flange 150 of the ring 146. The hole 154 extends radially, with its outer end being exposed along the housing 2. It receives a set screw 156 that, when turned down against the outer flange 150, will create a detent in the flange 150, or if the screw 156 has a cone-needle point, will actually penetrate the flange 150. In either event, the ring 146 does not rotate, and the setting for the opposed bearings 20 and 22 remains fixed.

The bearings 20 and 22 need not be tapered roller bearings, but may be other opposed bearings that are capable of being adjusted against each other, such as angular contact ball bearings. Typically, such alternative bearings will have raceways that are inclined with respect to the axis X.

The invention claimed is:

1. An axle center for the forward axle of a tandem axle drive, said axle center comprising:
   a housing;
   an input shaft located in the housing and projecting out of the housing for coupling to a drive shaft; and
   front and rear antifriction bearings supporting the input shaft in the housing for rotation about a primary axis, each bearing being configured to transfer a radial load and an axial load, the bearings being mounted in opposition, the front bearing including an inner raceway carried by the input shaft and presented outwardly away from the axis, an outer race threaded into the housing and having an outer raceway presented inwardly toward the inner raceway, and rolling elements located between the inner and outer raceways, the front bearing further including a locking ring attached to its outer race at one end of that race and lying along the housing where it is divided into multiple segments arranged circumferentially, one of the segments being bent outwardly in the provision of a tab that engages the housing and prevents the outer race from rotating in the housing;
   whereby rotation of the outer race before a segment is bent outwardly will displace the outer race axially and control the setting of the bearings.

2. An axle center according to claim 1 and further comprising:
   a gear carried by the input shaft;
   a pinion shaft located in the housing for rotation about an offset axis;
   a gear carried by the pinion shaft and engaged with the gear on the input shaft; and
   differential gearing located in the housing and driven by the pinion shaft.

3. An axle center according to claim 2 and further comprising:
   an output shaft aligned with the input shaft and supported by the front and rear bearings;
   a through shaft coupled to the output shaft for rotation with the output shaft at the same velocity as the output shaft; and
   a through shaft bearing supporting the through shaft in the housing for rotation about the primary axis.

4. An axle center according to claim 3 and further comprising an interaxle differential located in the housing and coupling the input shaft to the output shaft so that the input and output shafts may rotate about the axis at different angular velocities.

5. An axle center according to claim 1 wherein the housing has a front bearing seat through which the input shaft extends, and the bearing seat contains an internal thread; and wherein the outer race of the front bearing has an external thread that engages the internal thread of the bearing seat.

6. An axle center according to claim 5 wherein the housing contains a recess that opens toward the axis, and the tab of the locking ring is bent into the recess.

7. An axle center according to claim 1 wherein the segments have holes; and further comprising a screw that extends through the hole in the segment that is bent to create the tab, and the screw threads into the housing.

8. An axle center according to claim 7 wherein the holes are slots that open out the end of the locking ring.

9. An axle center according to claim 1 wherein the locking ring is welded to the outer race.

10. An axle center according to claim 1 wherein the locking ring has two axially directed flanges arranged one inside the other, with the outer flange containing the segments, and a web connecting the flanges, and the locking ring is attached to the outer race at its web.

11. An axle center according to claim 1 wherein the locking ring has an axially directed flange and the segments are along the flange.

12. An axle center according to claim 11 wherein the locking ring also has a radially directed portion from which the flange projects, and the locking ring is attached to the outer race along the radially directed portion.

13. An axle center for the forward axle of a tandem axle drive, said axle center comprising:
   a housing having at one end a bearing seat that contains an internal thread;
   axially aligned input, output and through shafts extending through the housing with the input shaft projecting out of the one end of the housing beyond the bearing seat and the through shaft projecting out of the opposite end of the housing; and front, rear and through shaft bearings supporting the shafts for rotation about a common axis, the front bearing including an inner raceway that is carried by the input shaft and is inclined with respect to the axis, an outer race having an outer raceway presented toward the inner raceway and inclined with respect to the axis in the same direction as the inner raceway and further having an external thread that is engaged with the internal thread of the bearing seat, and rolling elements located in a single row between the raceways, the front bearing also including a locking ring that is attached to its outer race at one end of the outer race and has an axially directed flange that is divided into segments, at least one of the segments being deformed outwardly in the provision of a tab that engages the housing and prevents rotation of the outer race in the bearing seat;

the through shaft bearing supporting the through shaft;

the rear bearing supporting the input and output shafts and including an inner raceway that is presented outwardly on the output shaft and is inclined with respect to the axis in the direction opposite to which the inner raceway of the front bearing is inclined, an outer raceway carried by the housing and presented toward and inclined in the same direction as the inner raceway, and rolling elements arranged in a single row between the inner and outer raceways, whereby the front and rear bearings are opposed and, before the tab of the locking ring is bent outwardly, may be adjusted against each other by rotating the outer race of the front bearing;

a pinion shaft mounted in the housing for rotation about an axis offset from the axis of the input and output shafts;

gears connecting the input shaft and the pinion shaft; and differential gearing coupled in the housing to the pinion shaft.

14. An axle center according to claim 13 and further comprising an interaxle differential coupling the input shaft and the output shaft; and wherein the inner raceway of the rear bearing rotates with and at the same velocity as the output and through shafts.

15. An axle center according to claim 1 wherein the locking ring is formed from low carbon steel.

* * * * *